US005608838A

United States Patent [19]

Brookley

[11] Patent Number: 5,608,838

[45] Date of Patent: Mar. 4, 1997

[54] BLACKBODY TYPE HEATING ELEMENT FOR CALIBRATION FURNACE WITH PYROLYTIC GRAPHITE COATING DISPOSED ON END CAP ELECTRODE MEMBERS

[76] Inventor: Charles E. Brookley, 330 Allegany St., Frostburg, Md. 21532

[21] Appl. No.: 350,691

[22] Filed: Dec. 7, 1994

[51] Int. Cl.$^{6}$ ................................ H05B 3/00; F27D 1/00; G01K 15/00

[52] U.S. Cl. .......................... 392/407; 392/416; 219/553; 373/117; 250/493.1; 250/252.1; 374/2

[58] Field of Search .................................... 392/407, 416; 219/552, 544, 553, 548, 390; 373/114, 117; 250/495.1, 504 R, 493.1, 252.1; 374/2

[56] References Cited

U.S. PATENT DOCUMENTS

| | | | |
|---|---|---|---|
| 2,768,277 | 10/1956 | Buck et al. | 373/117 |
| 3,138,697 | 6/1964 | Banca et al. | 219/553 |
| 3,213,177 | 10/1965 | Diefendorf | 373/117 |
| 3,263,016 | 7/1966 | Branstetter et al. | 219/553 |
| 3,891,828 | 6/1975 | Corso | 219/383 |
| 4,178,530 | 12/1979 | Lersmacher et al. | 313/337 |

FOREIGN PATENT DOCUMENTS

| | | | |
|---|---|---|---|
| 3047849 | 7/1982 | Germany . | |
| 148552 | 1/1962 | U.S.S.R. | 374/2 |
| 222573 | 10/1968 | U.S.S.R. | 219/553 |
| 467243 | 7/1975 | U.S.S.R. . | |
| 1165137 | 5/1994 | U.S.S.R. . | |

OTHER PUBLICATIONS

Chernin, "High–Temperature Source of Blackbody Radiation for Calibrating Spectroscopic and Radiometric Instruments", Inst. of Chem. Physics, Academy of Sciences USSR, Nov.–Dec. 1973.

Hattori, S., "Blackbody at the Gold Point to Establish the High Temperature Scale", Trans. Soc. Instrum. and Control Engr (Japan), v1 N1, pp. 51–58, Feb.1975.

McFee, R., "Blackbody Source Unit with Electronic Temperature Control", The Review of Scientific Instruments, vol. 23, No. 1, Jan. 1952.

Shijie et al., "3500K High Frequency Induction Heating Blackbody Sources", AIAA/ASME 4th Joint Thermophysics and Heat Transfer Conference, Jun. 2–4, 1986.

*Primary Examiner*—John A. Jeffery

[57] ABSTRACT

A blackbody type heating element for calibration furnaces employs an elongated hollow cylinder of graphite open at first and second opposite ends. The cylinder has an integral solid graphite partition centrally disposed in the cylinder and oriented at right angles to an axis of elongation of the cylinder. First and second end caps are disposed adjacent corresponding ones of the first and second cylinder ends. Each cap has a first electrically conductive member adapted to be connected as an electrode to a suitable source of electrical energy and a second graphite type hollow cylindrical member open at both ends engaging the first member. The second member has a coating of pyrolytic graphite. Each second member is connected directly through its coating to the corresponding end of the cylinder. The openings in the second member are aligned with this corresponding end.

8 Claims, 2 Drawing Sheets

BLACKBODY TYPE HEATING ELEMENT FOR CALIBRATION FURNACE WITH PYROLYTIC GRAPHITE COATING DISPOSED ON END CAP ELECTRODE MEMBERS

BACKGROUND OF THE INVENTION

Known very high temperature calibration furnaces are used calibrating thermal instrumentation such as optical pyrometers, radiometers, thermal scanners and thermocouples. For these applications, a tubular heating element includes a hollow tube of graphite open at both ends and having an integral centrally disposed partition oriented at right angles to the axis of elongation of the tube. The tube thus consists of dual back to back symmetrical cavities which have opposite open ends and a common closed end formed by the partition. When the element is electrically energized, these cavities function as blackbodies which radiate equal amounts of radiation in opposite directions through the open ends of the cavities, the radiation essentially satisfying the well known Planck formula for blackbody radiation.

In order for these cavities to closely approach the ideal black body described by the Planck formula, it is necessary for all internal walls to be maintained at a uniform temperature. In addition, the surface emittance must be large and the length L of the cavity is at least equal to its diameter D. which results in an apparent emissivity approaching 1.00 at both mouths of the heated zone.

Known blackbodies having dual cavities made of graphite exhibit large thermal gradients and only contain internal walls at uniform temperature in a very small region, wherein the length L of the region is equal to the diameter D of the partition and the apparent emissivity of this area is equal to about 0.98. The apparent emissivity is the emittance measured at the opening of the heated zone.

In order to improve the apparent emissivity of such blackbodies, it is necessary to increase the length of the region which contains internal walls at uniform temperature.

The present invention is directed toward dual cylindrical blackbody structures made of graphite which exhibit improved performance by minimizing thermal gradients.

SUMMARY OF THE INVENTION

Accordingly, it is an object of the present invention to provide black body structures closely approaching the ideal blackbody, having dual cavities wherein thermal gradients are reduced, and the length of the region which contains internal walls at uniform temperature is increased.

Another object is to provide new and improved blackbody structures having dual cavities wherein thermal gradients are equally reduced and the apparent emissivity of both cavities are increased equally.

These and other objects and advantages of this invention will either be explained or will become apparent hereinafter.

In accordance with the principles of this invention, a blackbody type heating element utilizes an elongated hollow cylinder of graphite open at first and second opposite ends. The cylinder has an integral solid graphite partition centrally disposed in the cylinder and oriented at right angles to the axis of elongation of the cylinder.

Each one of first and second end caps is disposed adjacent a corresponding one of the first and second cylinder ends. Each end cap has a cylindrical shape defining an outer copper cylinder which is open at both ends. Each cap is provided with a first electrically conductive member adapted to be connected as an electrode to a suitable source of electrical energy. Each end cap is also provided with a second graphite type hollow cylindrical member open at both ends which is in contact with the first member and has a coating of pyrolytic graphite. The coating is connected directly to the corresponding end of the cylinder. The openings in each second member are aligned with the opening in the corresponding end of the cylinder.

Each second member has essentially concentric inner and outer surfaces and the pyrolyric coating is interfaced [by a locking taper connection] with at least a portion of a corresponding one of these surfaces.

When the coating is deposited on the outer surface of the second member, the second member is positioned inside the corresponding end of the cylinder and its coating engages the inner surface of this corresponding end.

When the coating is deposited on the inner surface of the second member, the second member is positioned surrounding the corresponding end of the cylinder and its coating engages the outer surface of the corresponding end.

The cylinder can be disposed concentrically within a quartz tube, with the space between the cylinder and tube either filled with insulation or inert gas.

When the coating of pyrolyric graphite is deposited on tile outer surface of the second member, and the space between the quartz cylinder and the tube is filled with insulation, use of this coating reduces thermal gradients and increases tile length L of the region containing internal walls at uniform temperature to about one and one half times tile diameter D of the central partition as compared to the unity ratio of L to D when the coating is not used. Tile apparent emissivity is increased from about 0.98 to about 0.99. Pyrolytic carbon is a known and widely used multi-layered structure having anisotropic properties so that it has high electrical resistance and low thermal conductivity in the plane of the layers and has low electrical resistance and high thermal conductivity in a plane at right angles to the plane of the layers. The pyrolytic coating is applied and used in the manner in the art with the layers disposed at right angles to the graphite member to prevent heat loss which would otherwise prevent the internal walls from being maintained at uniform temperature. If the layers were to be disposed parallel to the member, the high thermal conductivity would accentuate rather than prevent such heat loss.

Under these conditions, when the insulation between the tube and cylinder is removed, the thermal gradient is further reduced and the apparent emissivity is further increased to 0.999.

When the coating of pyrolyric graphite is deposited on the inner surface of the second member, and the space between the quartz cylinder and the tube is filled with insulation, the length of the region containing walls at uniform temperature is increased as before, but the apparent emissivity is increased to 0.999.

In order to obtain the highest efficiency and highest operating temperatures and at the same time retain an apparent emissivity of 0.999, it is necessary to use the structure employing pyrolytic coating on the inner surface of the second member while retaining insulation between the tube and cylinder. The apparent emissivity of 0.999 can be retained when the structure employing pyrolytic coating on the outer surface of the second member is used, but the insulation must be removed, resulting in a decrease in efficiency and a decrease in highest operating temperature.

For a cylinder of given diameter, use of the pyrolytic coating on the inner surface of the second member produces a smaller aperture while use of the pyrolytic coating on the outer surface of the second member produces a larger aperture.

The aperture size is a very important parameter in certain applications, since it defines the area of emitted radiation. The position of the pyrolytic coated second member relative to the cylinder determines the aperture.

Water is circulated through the end caps to prevent over heating. Inert gas is directed in two directions through the end caps to purge the air from the heated zone and purge the air from the space inside the quartz cylinder. This is necessary since all forms of graphite will burn in air if heated.

DETAILED DESCRIPTION OF PREFERRED EMBODIMENTS

Figure 1:
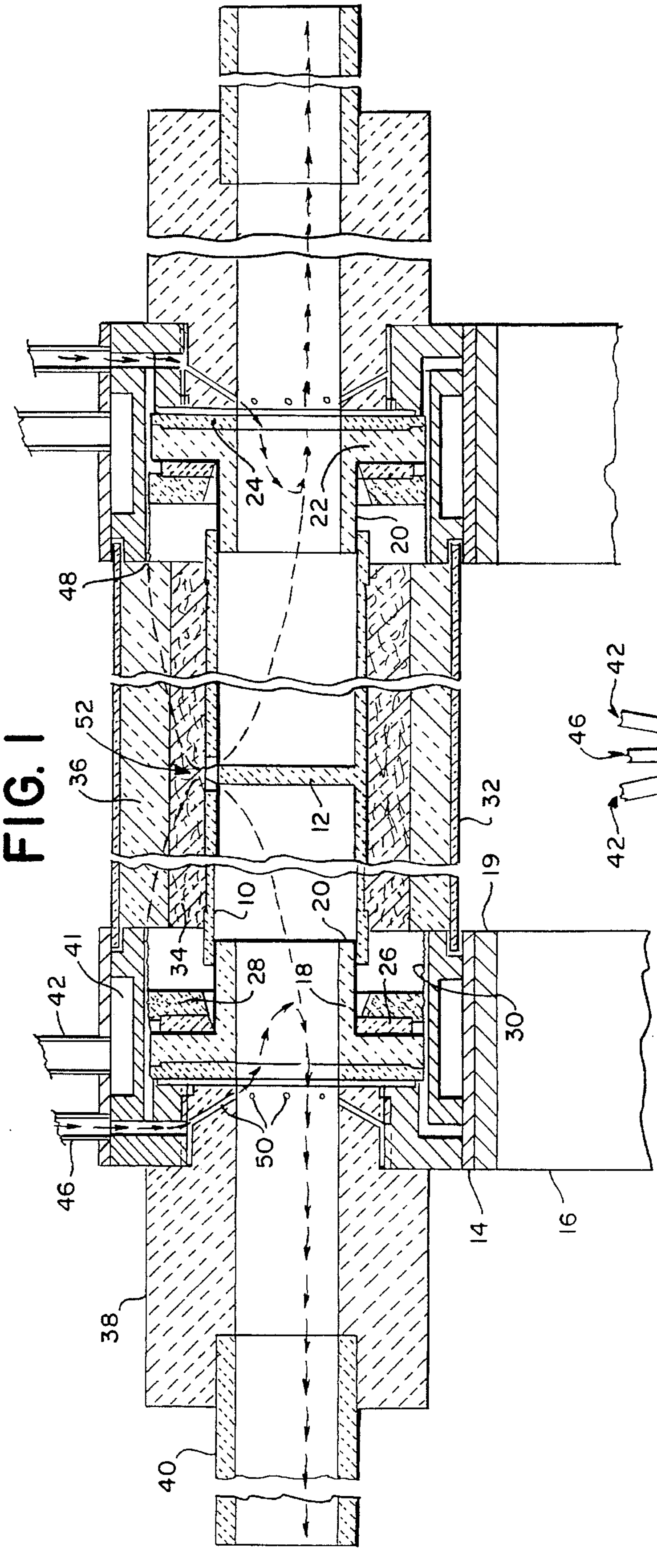
FIG. 1 is a longitudinal cross sectional view of one embodiment of the invention.
Figure 2:
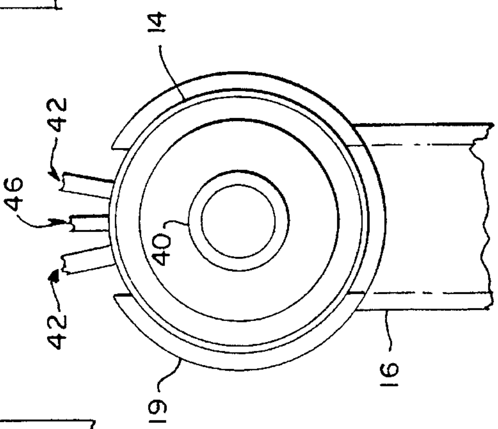
FIG. 2 is a cross sectional view of an end cap taken at right angles to the view shown in FIG. 1.

Referring first to FIGS. 1 and 2, there is shown a blackbody type heating assembly for calibration furnaces employing an elongated hollow cylinder 10 of graphite open at first and second opposite ends. The cylinder has an integral solid graphite partition 12 centrally disposed in the cylinder and oriented at right angles to an axis of elongation of the cylinder.

First and second end caps are disposed adjacent corresponding ones of the first and second cylinder ends. These caps and their associated parts are disposed symetrically about the partition 12. For convenience a portion of the structure shown to the right of the partition has been cut away.

These caps have a cylindrical shape with an outer copper cylinder 14 which is open at both ends. Each cap is bolted to a first copper member 16 adapted to be connected as an electrode to a suitable source of electrical energy. The member has a copper cradle 19 to enable the electrode to be connected to the end cap.

Each cap also contains a second graphite type hollow cylindrical member 18 open at both ends and engaging the first member. The second member is typically made of a graphite cloth layered graphite composite structure known to the art as CARBITEX. The outer surface of cylinder 18 has a coating 20 of pyrolytic graphite. Each cylinder 18 has one end is positioned inside the corresponding end of the cylinder 10 so that coating 20 engages the inner surface of the corresponding end of the cylinder 10. The cross sectional areas of the open ends of cylinder 18 are each smaller than the cross sectional area of the opening in the corresponding end of the cylinder 10. To provide enhanced locking engagement, the outer surface of cylinder 18 is tapered inwardly toward the cylinder 10 and the inner surface of the cylinder 10 adjacent cylinder 18 has a conforming taper.

The open end of cylinder 18 remote from the cylinder 10 has an integral CARBITEX ring 22. Ring 22 bears against a pyrolytic graphite washer 24. Another pyrolytic graphite washer 26 bears against coating 20 and another CARBITEX ring 28 compresses all washers using a threaded section 30.

A hollow transparent quartz tube 32 open at both ends extends between and is secured at its ends in the end caps. Cylinder 10 is disposed concentrically within tube 32 and the annular region between the tube 32 and the cylinder 10 is filled with graphite felt insulation 34 and graphite foil tape insulation 36.

Hollow circular regions 41 and member 42 shown in the end caps at 32 are required for the flow of cooling water which can be recirculated upon removal of heat.

In order to prevent air from leaking into the structure and oxidizing the heated zone, it is necessary to cause inert gas to flow through the structure. This gas flow is shown by arrows 44 in FIG. 1.

Inert gas enters each end cap at 46. It then flows through gas paths 48. There are four such paths in each cap. At the same time, gas flows through each of eight inclined gas holes 50. The gas flowing through paths 48 then reaches slot 52 at the top of partition 12 and then is reversed to blend with the gas flowing through holes 50.

Hollow graphite extension cylindrical members 38 are secured at one open end in each cap at the end remote from cylinder 10. Hollow graphite extension tubes 40 are each secured at one end to the corresponding member 38. The blended Inert gas exhibits laminar flow as it passes through members 38 and tubes 40. Without such passage, the desired blocking laminary purge front of the gas will not be maintained and air can leak into the structure and oxidize the heated parts.

Figure 3:
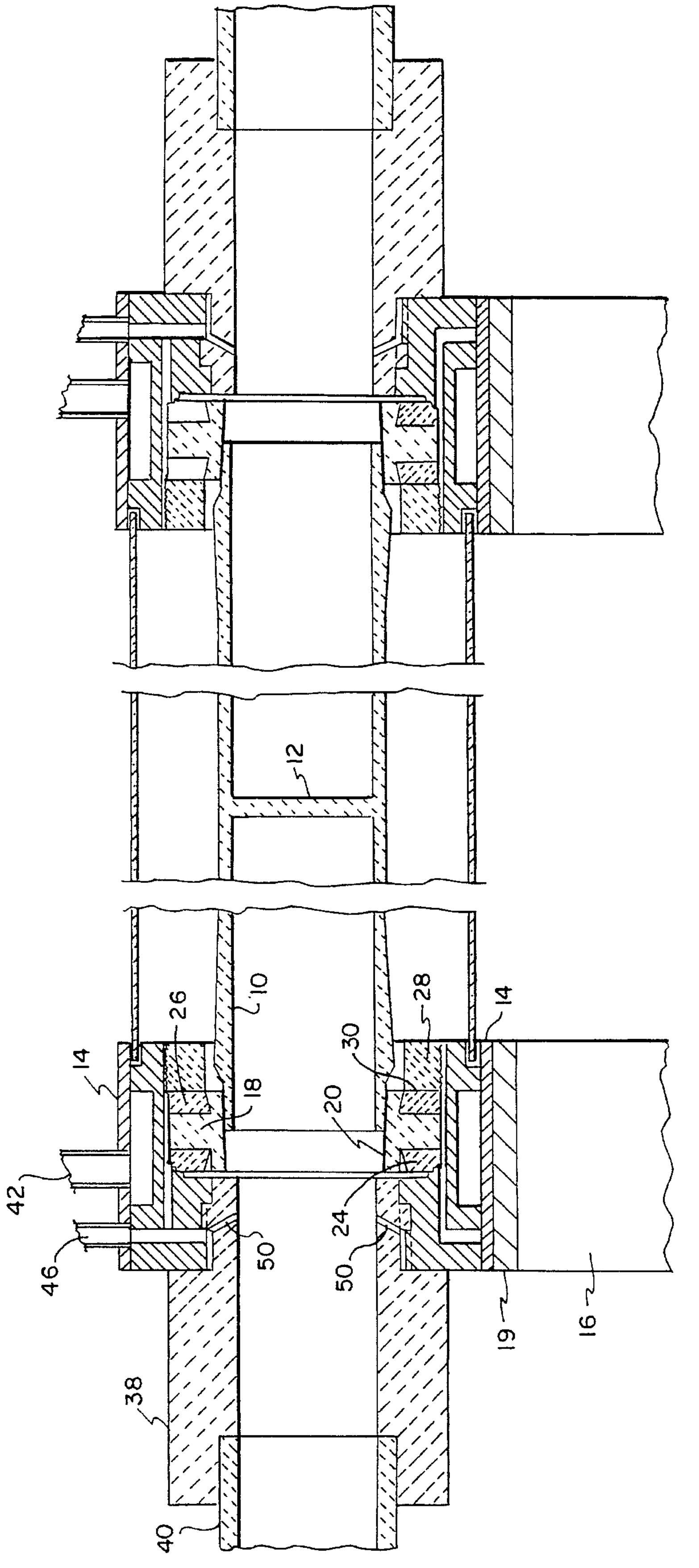
FIG. 3 is a detail longitudinal cross sectional view of a second embodiment of the invention.

Referring now to FIG. 3, it will be seen that the structure shown differs from that of FIGS. 1 and 2 only in that the inner surface of cylinder 18 rather than the outer surface has a coating 20 of pyrolytic graphite. The corresponding end of cylinder 10 is disposed within the cylinder 18 so that coating 20 engages the outer surface of the corresponding end of the cylinder 10. The cross sectional areas of the open ends of cylinder 18 are each larger than the cross sectional area of the opening in the corresponding end of the cylinder 10. To provide locking taper engagement, the inner surface of cylinder 18 is tapered inwardly toward the cylinder 10 and the outer surface of the cylinder 10 adjacent cylinder 18 has a conforming taper.

As explained earlier, the insulation can be removed when desired.

While the invention has been described with particular reference to preferred embodiments, the protection sought is to be limited only by the terms of the claims which follow.

What is claimed is:

1. A blackbody type heating element for calibration furnaces producing an apparent emissivity value falling within the range 0.99 to 0.999 and comprising:

an elongated hollow cylinder of graphite open at first and second opposite ends, the cylinder having an integral solid graphite partition centrally disposed in the cylinder and oriented at right angles to an axis of elongation of the cylinder;

first and second end caps disposed adjacent and surrounding corresponding ones of the first and second cylinder ends, each end cap having a first electrically conductive member adapted to be connected as an electrode to a suitable source of electrical energy and a second graphite hollow cylindrical member open at both ends engaging the first member, the second member having a coating of pyrolytic graphite, each second member being connected directly through its coating to the corresponding end of the cylinder to prevent heat loss thereat, the openings in the second member being aligned with the corresponding end.

2. The element of claim 1 further including a hollow quartz tube open at both ends and secured at each end to a corresponding one of said end caps, the graphite cylinder being spaced from and disposed within said tube.

3. The element of claim 2 further including insulation in said disposed between and engaging the quartry tube and the graphite cylinder.

4. The element of claim 1 wherein each second member and outer essentially concentric surfaces and the pyrolyric coating covers at least a portion of a selected one of said surfaces.

5. The element of claim 4 wherein each pyrolytic graphite coating is applied to the outer surface of the corresponding second member and each second member is positioned inside the corresponding end of the cylinder so that its coating engages the inner surface of the corresponding end of the cylinder, the cross sectional areas of the second member openings being smaller than the cross sectional area of the opening in the corresponding end of the cylinder.

6. The element of claim 4 wherein each pyrolyric coating is applied to the inner surface of the corresponding second member and the corresponding end of the cylinder is positioned within the corresponding second member so that its coating engages the outer surface of the corresponding end of the cylinder, the cross sectional areas of the second member openings being larger than the cross sectional area of the opening in the corresponding end of the cylinder.

7. The element of claim 1 further including means to circulate an inert gas within each end cap.

8. The element of claim 1 further including means to circulate cooling water within each end cap.

* * * * *